Figure 5:
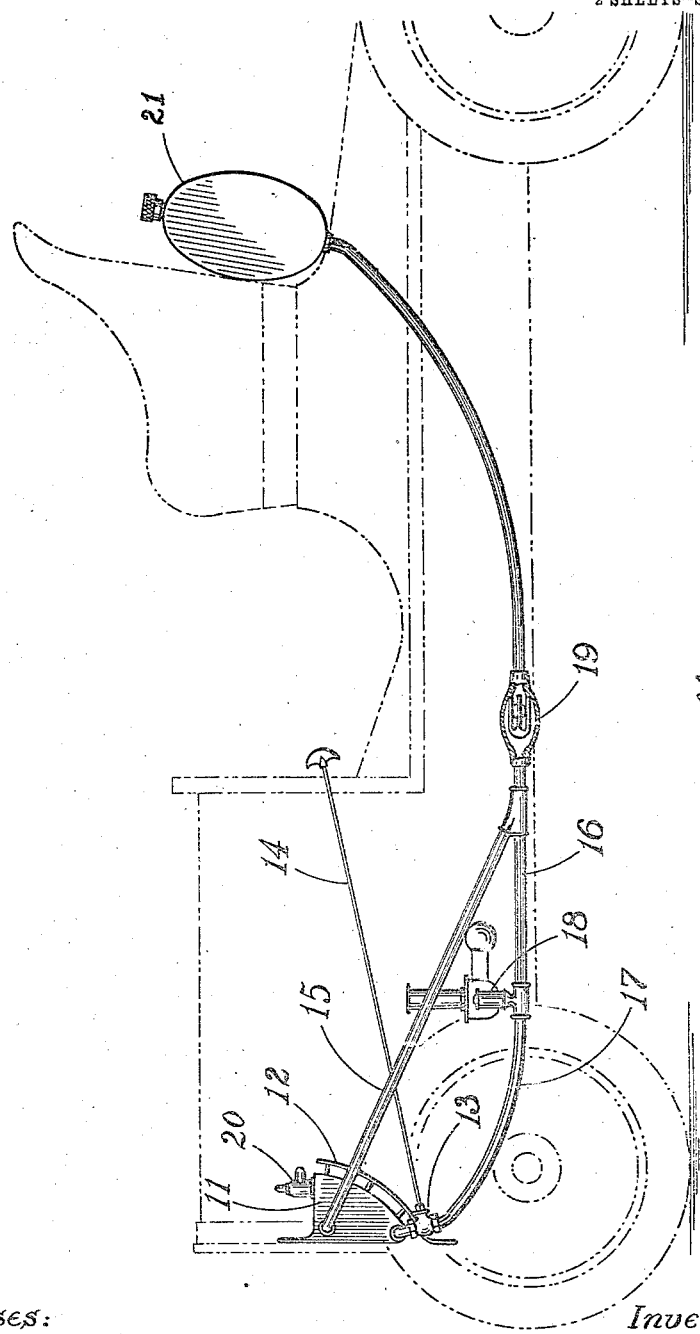

E. C. SMITH.
GRAVITY FEED EMERGENCY DEVICE FOR MOTOR VEHICLES.
APPLICATION FILED APR. 27, 1911.
1,009,193.
Patented Nov. 21, 1911.
2 SHEETS—SHEET 1.
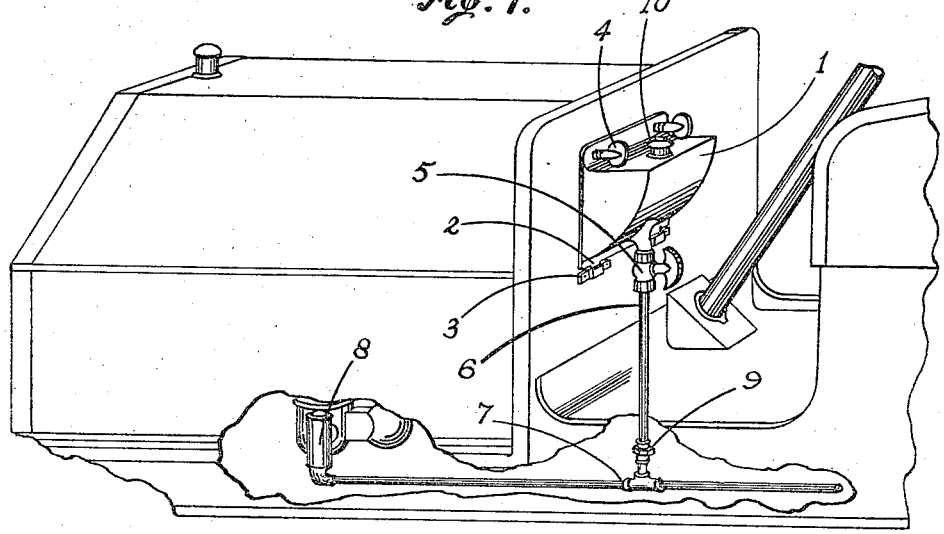
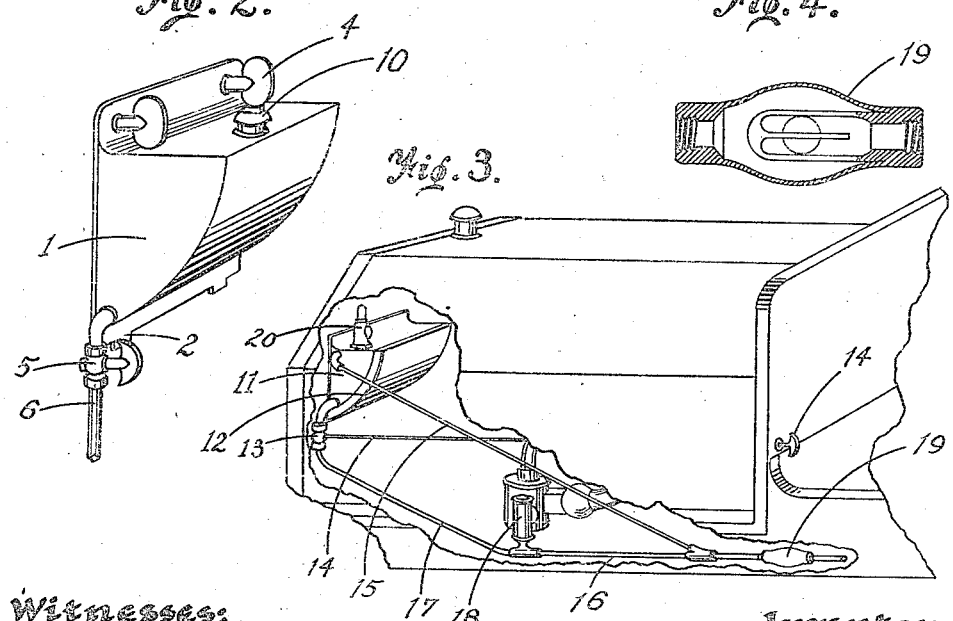
Witnesses:
F. M. Keeney.
J. W. Masters
Inventor.
Edward C. Smith

UNITED STATES PATENT OFFICE.

EDWARD C. SMITH, OF SAN DIEGO, CALIFORNIA.

GRAVITY-FEED EMERGENCY DEVICE FOR MOTOR-VEHICLES.

1,009,193.  Specification of Letters Patent.  Patented Nov. 21, 1911.

Application filed April 27, 1911. Serial No. 623,782.

*To all whom it may concern:*

Be it known that I, EDWARD C. SMITH, a citizen of the United States, residing at San Diego, in the county of San Diego and State of California, have invented a new and useful Gravity-Feed Emergency Device for Motor-Vehicles, of which the following is a specification.

This invention has relation to an emergency fuel feeding device for motor vehicles, more particularly of that class having gas or internal combustion engines for the motive power, and in which the fuel supply tank and motor are located at opposite ends of the vehicle, the invention having the several features and advantages as herein specified, its objects being the provision of inexpensive and durable parts of simple construction whereby an emergency supply of fuel or gasolene may be kept in a position to be available for use, should the inclination of the vehicle or other cause prevent the main supply from reaching the carbureter.

In the usual construction of motor vehicles the fuel supply tank and the carbureter of the engine are located at opposite ends of the vehicle, being a considerable distance apart, the gravity system of feed being employed therein, and, when the vehicle is climbing a hill, the inclination of the vehicle is such that the fuel or gasolene fails to reach the carburetor, thus causing the engine to become "dead" at a crucial moment, and thereby stopping the vehicle. To obviate these and other defects I have provided a device in which an auxiliary tank, adapted to hold a small supply of fuel or gasolene, is so mounted as to be within easy reach from the driver's seat, and in a position which will cause the contents to be fed by gravity to the carbureter at any time the inclination of the vehicle will cause the main supply to fail, the auxiliary tank being detachable and provided with a stop-cock and a pipe extending therefrom to the main supply pipe of the carbureter, union joints and connections being provided whereby the device may be easily detached and bodily removed from the vehicle if desired. I further provide means for the automatic refilling of the auxiliary tank, a branch pipe extending from the main supply pipe to the top of the auxiliary tank in such manner that the fuel or gasolene will pass into the said auxiliary tank when the vehicle is inclined in going on a down-grade, and I further provide a ball-valve in the main supply pipe which permits the fuel or gasolene to pass freely to the carbureter and to the auxiliary tank, but prevents the contents of the auxiliary tank from going back into the main supply tank when the vehicle is climbing a hill, my invention comprising the combination and arrangement of parts, substantially as herein described and claimed, and of which a convenient embodiment is shown in the accompanying drawings.

While simple and efficient means are herein provided for accomplishing the objects of the invention and the elements shown and described are well adapted to serve the purposes for which they are intended, it is to be understood that no limitation is necessarily made to the precise structural details herein exhibited, but that changes, alterations, and modifications which are within the spirit and scope of the invention, may be made when desired.

Referring to the accompanying drawings in which like reference characters denote corresponding parts of the device: Figure 1 is a perspective view of an auxiliary tank attached to the dash-board of an automobile, and shows in detail the union connections and delivery pipe leading to the main supply pipe of the carbureter. Fig. 2 is a perspective and detail view of the auxiliary tank having the delivery pipe extending from a side thereof. Fig. 3 is a perspective and detail view of the auxiliary tank mounted in the forward end of the radiator, the tank being provided with a branch pipe leading from the main supply pipe to and entering the said auxiliary tank near the top, whereby the same may be automatically refilled when the forward end of the vehicle is lower than the rear, as in descending a steep grade, the arrangement as illustrated showing a different form of my invention. Fig. 4 is a sectional detail view of the ball check-valve which prevents the fuel or gasolene from returning into the main supply tank. Fig. 5 is a detail view of the device applied to a motor vehicle.

More particularly of the drawings, auxiliary tank 1 is preferably of tapering form narrow at the bottom whereby the contents may be thoroughly drained therefrom, and is provided with extensions 2, engaging with corresponding brackets 3, and with thumb-screws 4, whereby the auxiliary tank may be quickly attached to or removed from the vehicle. A stop cock 5, at the bottom of the auxiliary tank is adapted to control the flow of the oil-fuel or gasolene from said tank to the motor, a pipe 6 being provided which extends from the stop-cock to main supply pipe 7, leading to carbureter 8. Union connector 9 renders the device detachable. Tank-filler 10 is for refilling the auxiliary tank.

In the modified form of the invention illustrated in Figs. 3 and 4, auxiliary tank 11, is attached to the front end of the radiator and is provided with an additional wall 12, with an air space between the said wall and the body of the tank, whereby the contents of said auxiliary tank are protected from the heat of the engine. With the vehicle in motion a draft of cold air enters continuously at the bottom and passes to the top of said air space, thus cooling the contents of the auxiliary tank.

At the bottom of auxiliary tank 11, a stop-cock 13 is provided, the same being operable from the driver's seat by means of handle 14 extending through the dash-board of the vehicle. A branch pipe 15 extends from main supply tube 16, to the top of the auxiliary tank, and is adapted to convey the fuel thereto, as often as the vehicle may be sufficiently inclined with the front end lower than the rear. A delivery pipe 17, extends from stop-cock 13, to carbureter 18, carrying fuel thereto from the auxiliary tank, when released by the operator. A ball check-valve 19, in the main supply pipe, permits the free passage of fuel to the carbureter, but prevents the same from returning to the main supply tank 21 when fed from the auxiliary tank. A pop safety-valve 20, is provided to relieve any extreme pressure which might arise within the auxiliary tank.

It is to be understood that the auxiliary tank may be mounted on any part of the forward end of the vehicle without altering the principle of the invention, and similarly, various means may be provided for opening the stop-cock from the driver's seat, the essence of my invention comprising the arrangement of the auxiliary tank in any position above and within a relatively short distance from the carbureter, together with means for refilling the same automatically or otherwise, and means for releasing the contents thereof and conveying the same to the carbureter, my invention being operable by and applicable to the gravity system of fuel supply for motor vehicles.

I claim as my invention:

1. The combination with a motor vehicle having a carbureter, a main fuel supply tank, and a main fuel supply pipe from said main tank to the carbureter, of an auxiliary supply tank near to and above the plane of the carbureter, a delivery pipe leading from the auxiliary tank to the carbureter, a stop-cock in said delivery pipe for controlling the delivery of the contents of the auxiliary tank to the carbureter, a branch pipe extending from the main supply pipe to the top of the auxiliary tank for refilling the same, and a check-valve in the main supply pipe to prevent the fuel in the delivery and branch pipes from returning to the main supply tank of the vehicle, substantially as set forth.

2. The combination with a motor vehicle having a carbureter, a main fuel supply tank, and a main fuel supply pipe from said main tank to the carbureter, of an auxiliary supply tank, a delivery pipe extending from the auxiliary tank to the carbureter, a refilling pipe extending from the main supply pipe to the top of the auxiliary tank, and a check-valve in the main supply pipe for preventing the return of the fuel to the main fuel supply tank, the parts being arranged to automatically operate by gravity, substantially as set forth.

3. The combination with a motor vehicle having a carbureter, a main fuel supply tank, and a main fuel supply pipe from said main tank to the carbureter, of an auxiliary supply tank, means for delivering the contents of the auxiliary tank to the carbureter, a pipe between the auxiliary tank and main supply pipe for replenishing the supply of fuel in the auxiliary tank, and means for protecting the auxiliary tank from the heat of the engine and from an excess of pressure within the tank, comprising a safety-valve mounted on the tank, and a protecting wall therefor with an air space between said wall and the body of said tank, adapted to the circulation of air therein during the motion of the vehicle, substantially as set forth.

4. In combination with a motor vehicle having a carbureter, a main fuel supply tank, and a main fuel supply pipe from said main tank to the carbureter, of an auxiliary supply tank mounted at the forward end of the vehicle, a pipe between the auxiliary tank and main supply pipe for refilling the auxiliary tank, means for delivering the contents to the carbureter, and an additional wall incasing said auxiliary tank having an opening at the bottom and top and an air space between the wall and the body of said tank for the circulation of air, substantially as set forth.

In testimony whereof, I affix my signature, in presence of two witnesses.

EDWARD C. SMITH.

Witnesses:
J. W. NASTED,
F. M. KEENEY.